United States Patent [19] [11] 4,373,320
Olivierse et al. [45] Feb. 15, 1983

[54] PACKING LINE FOR PACKING STACKS OF RECTANGULAR TINPLATE SHEETS ON PALLETS

[75] Inventors: Jan Olivierse, Velsen-Noord; Machiel A. H. van Es, Beverwijk, both of Netherlands

[73] Assignee: Hoogovens IJmuiden B.V., IJmuiden, Netherlands

[21] Appl. No.: 257,181

[22] Filed: Apr. 24, 1981

Related U.S. Application Data

[63] Continuation of Ser. No. 48,818, Jun. 15, 1979, abandoned.

[30] Foreign Application Priority Data

Jun. 21, 1978 [NL] Netherlands ................... 7806682

[51] Int. Cl.³ ........................................... B65B 13/04
[52] U.S. Cl. ...................................... 53/589; 53/544; 53/590; 198/414
[58] Field of Search ............... 198/414, 367, 370, 372; 53/582, 589, 590, 540, 544, 399

[56] References Cited

U.S. PATENT DOCUMENTS 2,907,152 10/1959 Hehsgen et al. .
2,932,929 4/1960 Fahrenbach et al. .
2,991,603 7/1961 Zuercher .
3,194,380 7/1965 Watson ............................... 198/414
3,295,660 1/1967 Nelson ............................... 198/414
3,456,773 7/1969 Titmas .
3,710,917 1/1973 Black et al. .
3,799,320 3/1974 Bilt ................................. 198/414 X

FOREIGN PATENT DOCUMENTS 92401 5/1972 Fed. Rep. of Germany .
1453206 10/1976 United Kingdom .

Primary Examiner—James F. Coan
Attorney, Agent, or Firm—Stevens, Davis, Miller & Mosher

[57] ABSTRACT

For packing stacks of tinplate sheets on pallets a packing line is disclosed by which a variety of different packagings of the stacks can be realized. To minimize the manual labor a plurality of endless chain conveyors is provided, forming together a path for the stacks. The first conveyor is liftable and rotatable and acts as collector on a pallet for the sheets. After the forming of a stack on the pallet on the first conveyor the first conveyor is rotated over 90° to align the runners of the pallet transversely to the travel direction of the stacks on the conveyor. At a manual packing station, the packaging is applied. Automatic strapping machines tie strips around each packed stack to complete the packaging. To provide temporary storage for the stacks in different stages, branch conveyors are provided in the form of roller conveyors.

5 Claims, 7 Drawing Figures

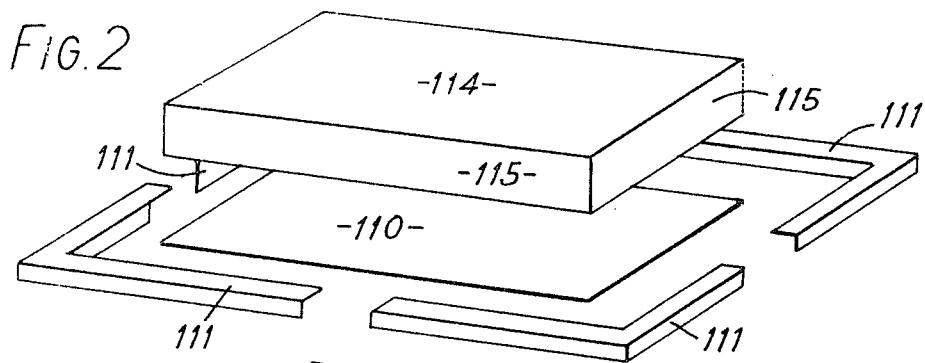
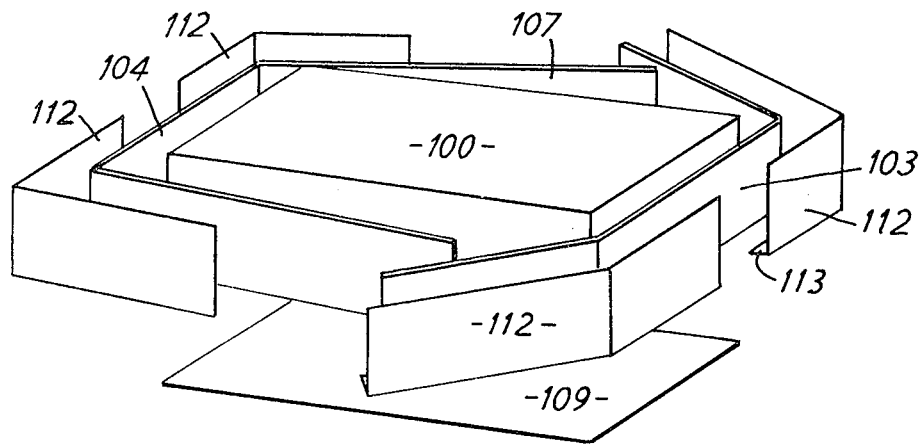
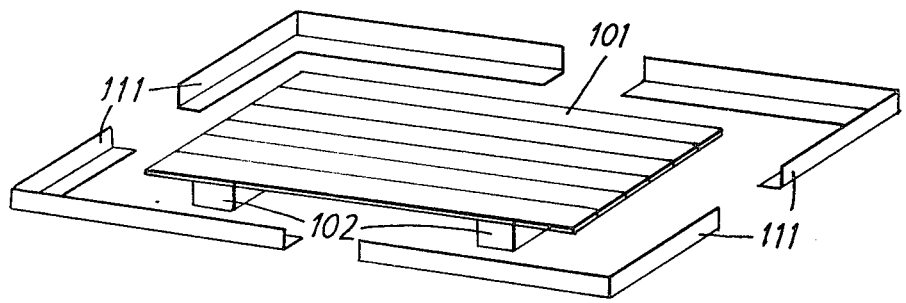
Fig.2

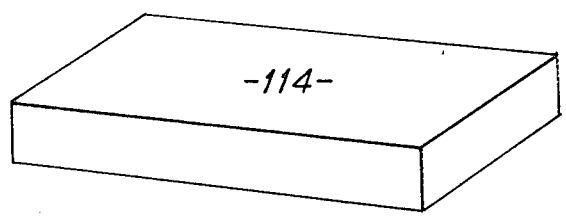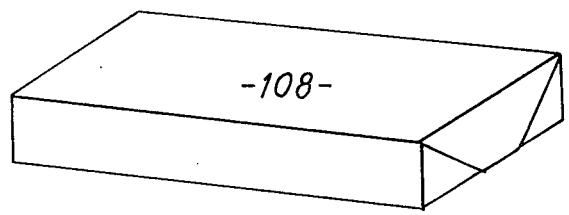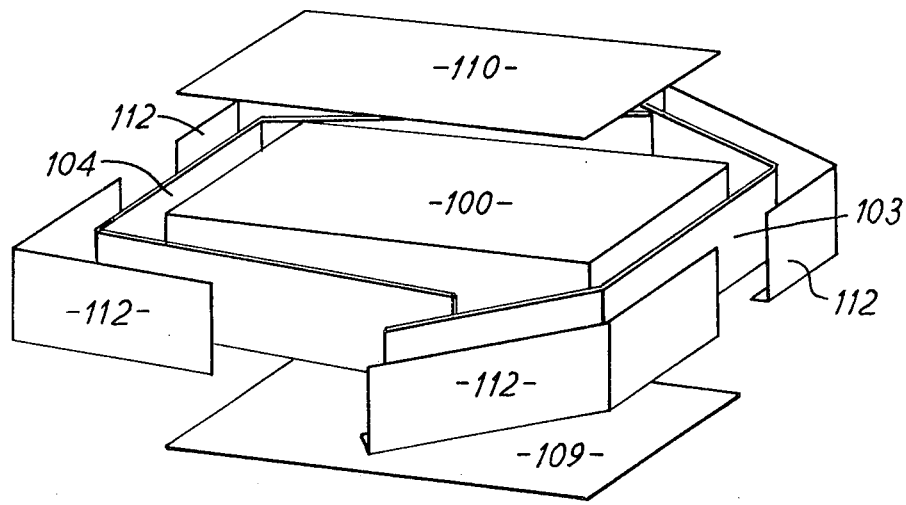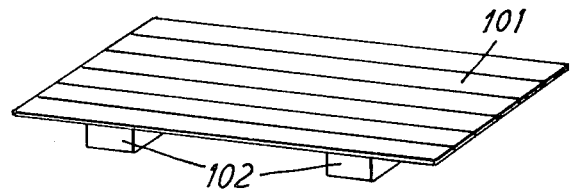
FIG.3

FIG.5
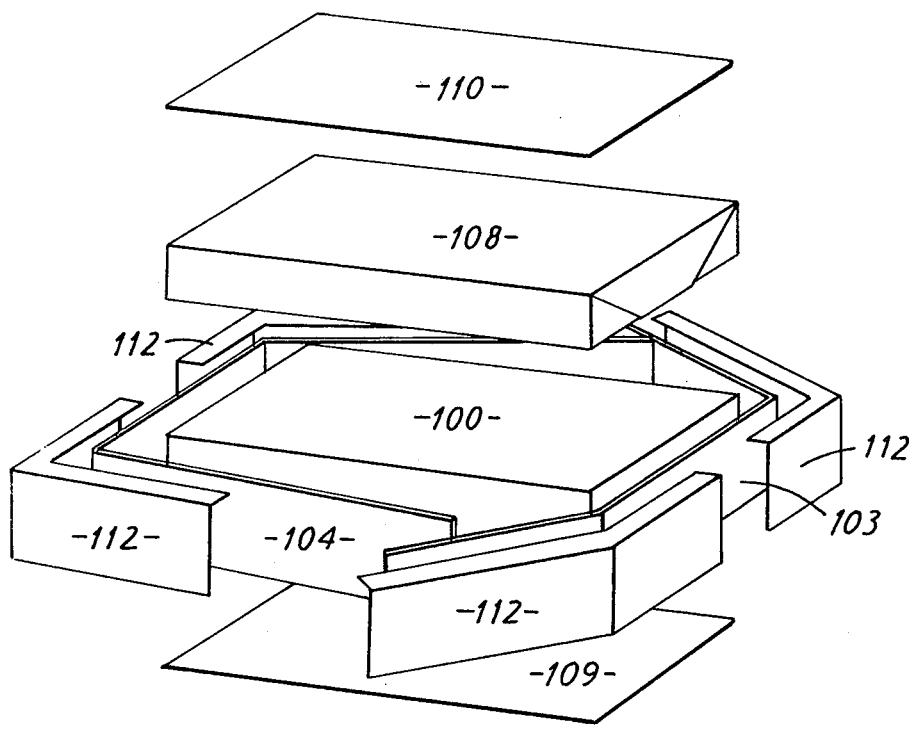
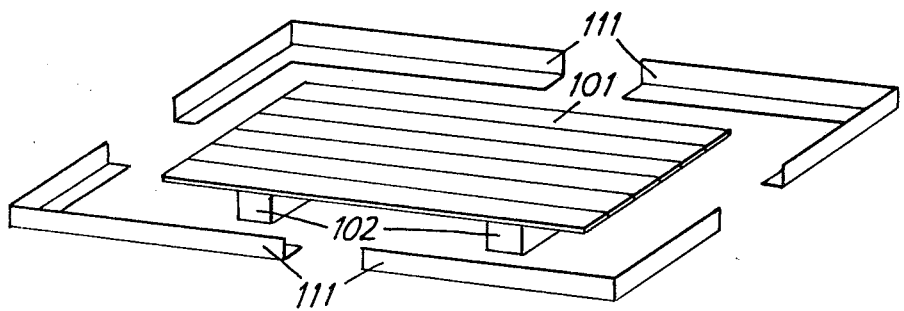

PACKING LINE FOR PACKING STACKS OF RECTANGULAR TINPLATE SHEETS ON PALLETS

This is a continuation of application Ser. No. 48,818 filed June 15, 1979, and now abandoned.

BACKGROUND OF THE INVENTION

1. FIELD OF THE INVENTION

This invention relates to a packing line for packing stacks of rectangular tinplate sheets on pallets, and more particularly to such a packing line arranged at the end of a tinning line in which steel strip is continuously tinplated and then cut into rectangular sheets which are stacked and packed in the packing line.

2. DESCRIPTION OF THE PRIOR ART

The packing of tinplate sheet stacks at the end of a tinning line presents particular problems. Though not very bulky (typically 80 cm × 80 cm × 30 cm), the stacks are heavy (e.g. 2 tons). The packed stack must therefore be capable of being easily handled and moved by means of a fork lift truck. This means that pallets must be employed. Tinplate is rather easily damaged, as the individual sheets are thin and they have a high-quality surface finish, but the packed stack will inevitably be subjected to rather rough treatment in its life. The packing must endeavour to protect the sheets from the effects of rough treatment, in particular to protect them against moisture and to prevent, if possible, that the sheets slide relatively one over another if the stack is subjected to a shearing force.

Another problem is that conventionally a number of different packings are used, the durability of the packing increasing with the distance which the packed stack is to travel to its consumer. As a result, any packing line must be able to cope with a variety of different packings, which makes automation extremely difficult. A number of different packings are described below.

A packing line for steel sheets is described in U.K. patent specification No. 1,250,707. It has a plurality of conveyors, a packing station at which packing is performed manually and a strapping machine. An automatic strapping machine must work transversely of the conveyor path, but where a roller conveyor is used to move a pallet, the runners of the pallet must extend parallel to the conveyor path (i.e. transverse to the roller axes) which makes use of an automatic strapping machine impossible.

Conventionally then, the degree of automation of the tinplate sheet stack packing line is low. The job is time-consuming and labour-intensive, as many as six packers being simultaneously required. Furthermore, the environment, being adjacent the shearing machine which is cutting the plate strip, is noisy.

SUMMARY OF THE INVENTION

The object of the invention is to provide a packing line for stacks of tinplate sheets on pallets which is automated to a high degree, and requires a minimum amount of manual labour, but which is yet adaptable to the several different kinds of packing which are needed.

According to the invention there is provided a packing line for packing stacks of rectangular tinplate sheets on pallets, comprising a plurality of conveyors arranged end-to-end to provide a conveyor path for the stacks, a collector station forming one end of said conveyor path at which a stack is formed on a pallet and at least one manual packing station in said conveyor path at which a packing is manually formed around the stack, while the stack is halted on the conveyor path. Over at least a portion of the conveyor path, the conveyors are chain conveyors each having endless members whose upper runs move parallel to the direction of travel of the stack and provide the support surface for the stack. The collector station is formed by one of said chain conveyors which is liftable and rotatable about a vertical axis through at least 90°, so as to be capable of turning a stack through 90°. The said manual workstation is also at one of said chain conveyors. Subsequent to the manual workstation in the direction of travel of the stack and also at one of said chain conveyors there is a strapping machine for automatically applying straps around a stack partially packed at said manual workstation.

The use of chain conveyors at the section of the conveyor path from the collector station at least to the strapping machine is advantageous because it enables the stacks to be on pallets whose runners are transverse to the direction of movement of the stacks. This makes possible the use of an automatic strapping machine operating transversely of the movement direction.

The collector station is a chain conveyor rotatable through 90° so that the orientation of the tinplate sheets with respect to that of the pallet runners can be chosen at will. On the conveyor, the pallet runners must be transverse to the chain direction, but since this conveyor can be turned through 90° the sheets may be stacked on the pallet with their sheared edges either parallel or perpendicular to the pallet runners. For reasons connected with their own processing techniques, some customers prefer one orientation and some the other.

It will be noted that the present invention proposes the retention of a manual packing station. This limited solution of the problem of automation of the packing line is adopted because of the extreme difficulty of automating the various different kinds of package. Nevertheless, it has been found possible, with the use of suitable aids to manual packing and because only partial packing is needed (the strapping machine providing automatic strapping) to reduce the number of manual packers required to one, or for double packing, to two.

The packing line of the invention preferably has, after said collector station and before said manual packing station, a branch conveyor (e.g. a roller conveyor) connecting to the main conveyor path for putting stacks into the main conveyor path and/or taking stacks out of the main conveyor at this point. It is often desired to introduce previously stacked stacks for packing.

To make double packing possible, the packing line may have a second manual workstation at one of said chain conveyors subsequent to said strapping machine, and a second strapping machine at one of said chain conveyors subsequent to said second manual workstation.

Suitably, a final one of said chain conveyors is a transfer station at which the packed stacks are transferred to a roller conveyor which provides temporary storage for the packed stacks, while they are waiting to be removed, e.g. by a fork lift truck.

To simplify manufacture and maintenance, at least some of said chain conveyors are preferably of identical length, so that parts are interchangeable between them. Most simply, each chain conveyor is composed of a plurality of side-by-side endless elements spaced from each other and driven in common.

BRIEF DESCRIPTION OF THE DRAWINGS

The preferred embodiment of the invention will now be described by way of non-limitative example with reference to the accompanying drawings, in which:

FIGS. 1 to 5 are respectively exploded perspective views of five different packagings for stacks of tinplate sheet, shown in order to illustrate the variety of packagings which a tinplate packing line is required to handle;

DESCRIPTION OF THE PREFERRED EMBODIMENT

Figure 1:
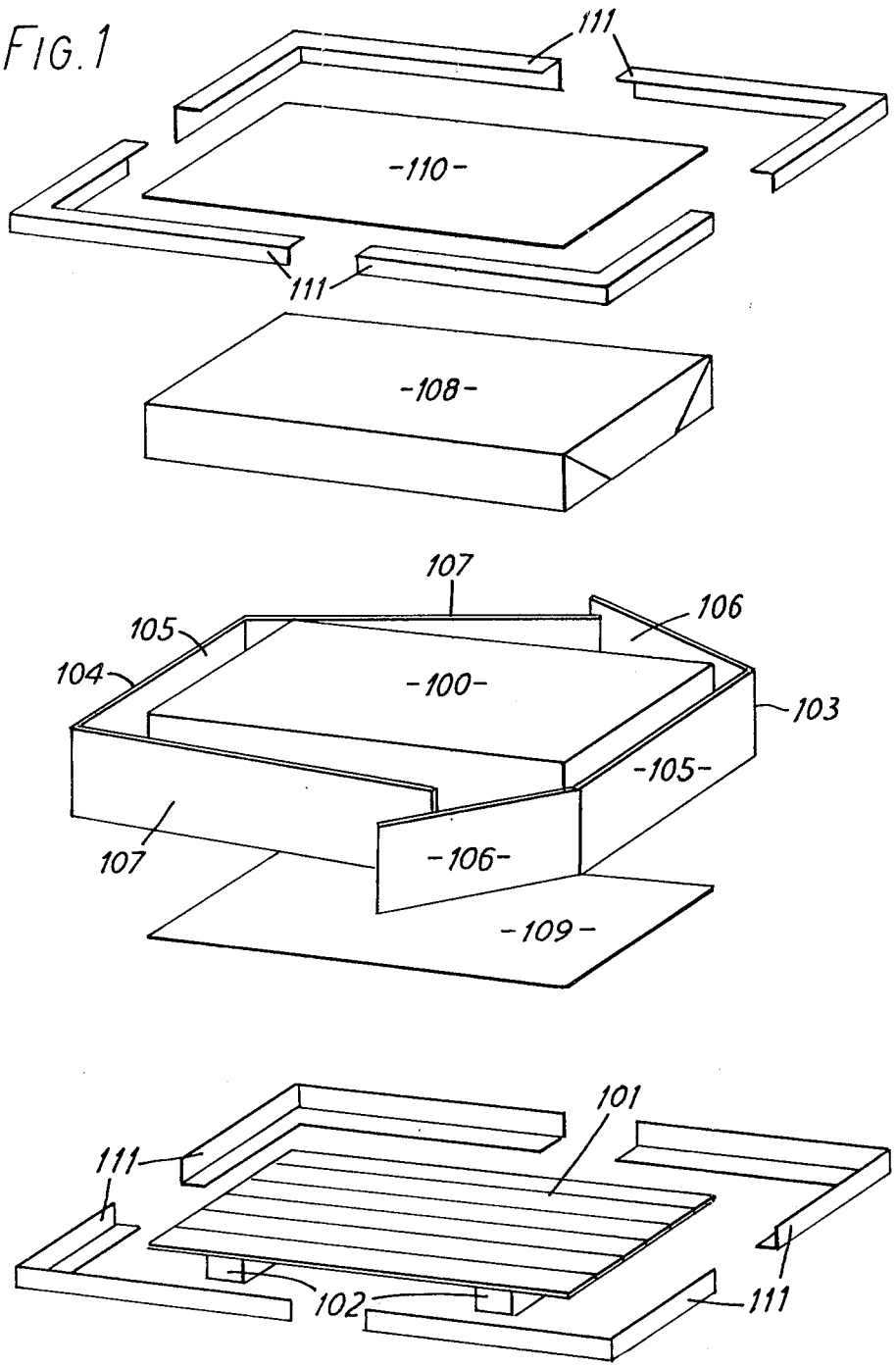
Figure 4:
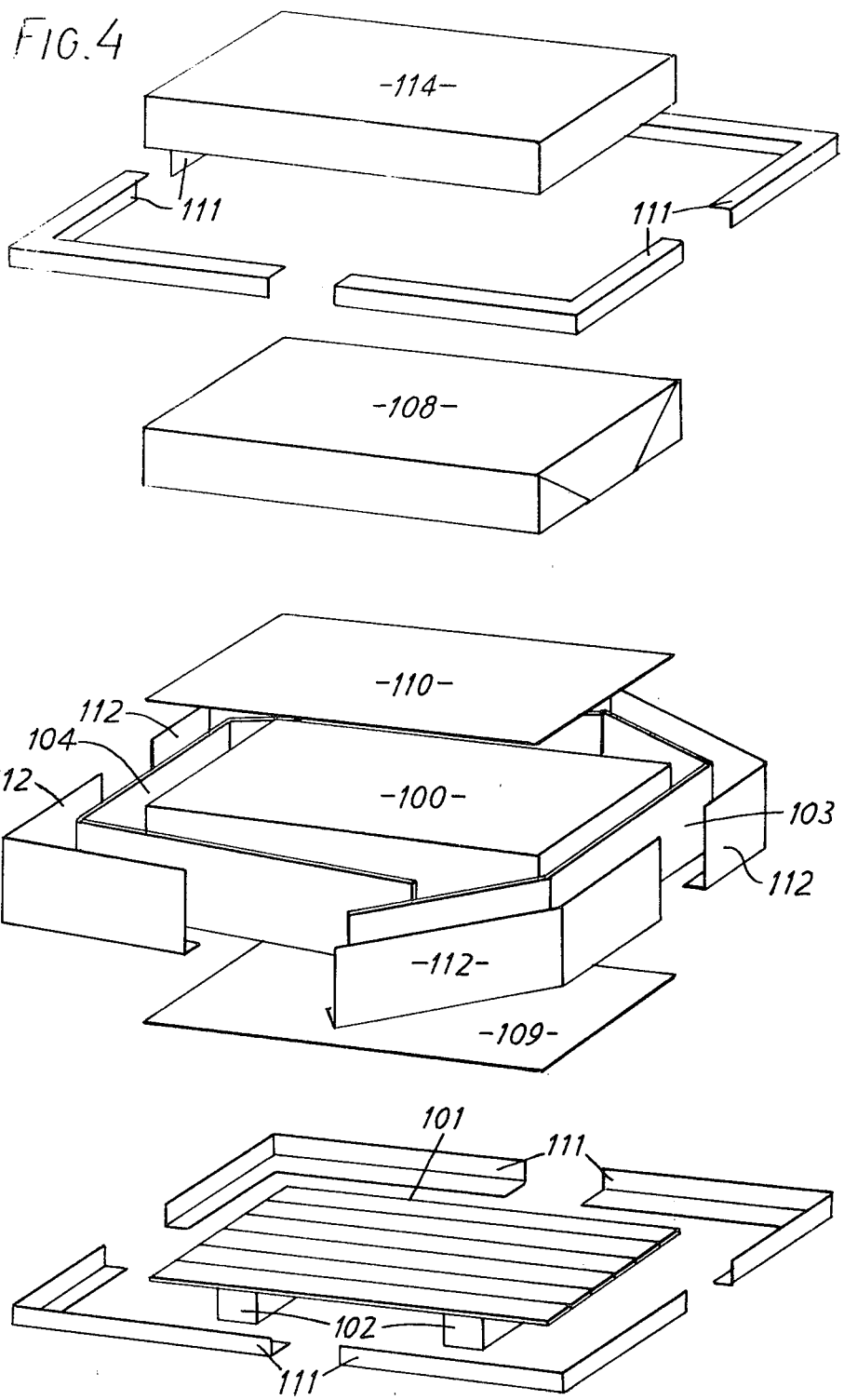

First, the packagings of FIGS. 1 to 5 will be described. In each of these, the tinplate stack 100 rests on a support board 101 of the pallet, which has transverse wooden runners 102.

In each case also, the vertical sides of the stack 100 are surrounded by U-shaped wrapping strips 103,104 formed by bending cardboard, the strips 103,104 having end portions 105 against the short sides of the stack and legs 106,107 lying along the long sides of the stack. The legs 106, 107 are thus perpendicular to the pallet runners 102. The width of the strips 103, 104 is about the same as the height of the stack.

In the packaging of FIG. 1 which is a so-called cardboard packing, the top of the stack 100 is covered by a sheet 108 of paper waxed on one side and folded down over the stack sides but not covering the whole of the sides. Beneath the stack is a double layer 109 of cardboard of high tensile strength, high shock resistance and good water resistance. Above the paper 108 is a sheet of board 110. In this packaging the strips 103,104 are each of two layers of thin cardboard, and the legs 106 of one 103 are shorter than the legs 107 of the other 104. The legs 106,107 overlap.

To each corner of the stack 100, an angle strip 111 made of steel is applied over the boards 109, 110 and the strips 103, 104, to reinforce the corners and the horizontal edges of the stack. There are thus eight angle strips 111; the two strips 111 along each edge of the stack overlap each other.

To complete the packaging an encircling steel tying strip (not shown) of high-tensile steel is put around the assembly passing over the short sides of the stack and its top and bottom. The pallet is grooved for this purpose. A number, e.g. four, steel tying strips are then applied in the other direction, i.e. parallel to the runners 102.

In FIGS. 2 to 5 the same reference numerals are used as in FIG. 1 for corresponding parts. Only the differences from the packaging of FIG. 1 will be described.

The packaging of FIG. 2 is called "N-steel". Four large angle strips 112 of steel are placed around each corner of the stack 100 outside the cardboard strips 103, 104 and the angle strips 111. The strips 112 have small flanges 113 beneath the stack and are not long enough to overlap each other, at least on the long sides of the stack. A steel lid 114 with side flanges 115 covers the top of the package. In this packaging tying strips are applied both before and after the steel parts 112,115 are put in place.

FIG. 3 shows a packaging called "E-steel" in which the angle strips 111 are omitted and in which the strips 103,104 are of a single cardboard layer. Reinforced tar paper is used for the sheet 108, instead of wax paper, and this sheet is above the board 110. Side steel angle strips 112 and a steel cover 114 are present, as in FIG. 2.

The package of FIG. 4 is again a carton packing, differing only from that of FIG. 2 in that tar paper is used for the sheet 108, which is above the board 110 and that the strips 103,104 are each a single sheet of cardboard.

FIG. 5 shows a body packing, which differs from that of FIG. 1 in that the four upper angle strips 111 are omitted. Also the wax paper is replaced by tar paper as the sheet 108. The strips 103,104 are single-thickness cardboard. Steel side strips 112 protect the vertical edges, as in FIG. 2, but their short flanges 113 overlie the top of the stack.

Figure 6:
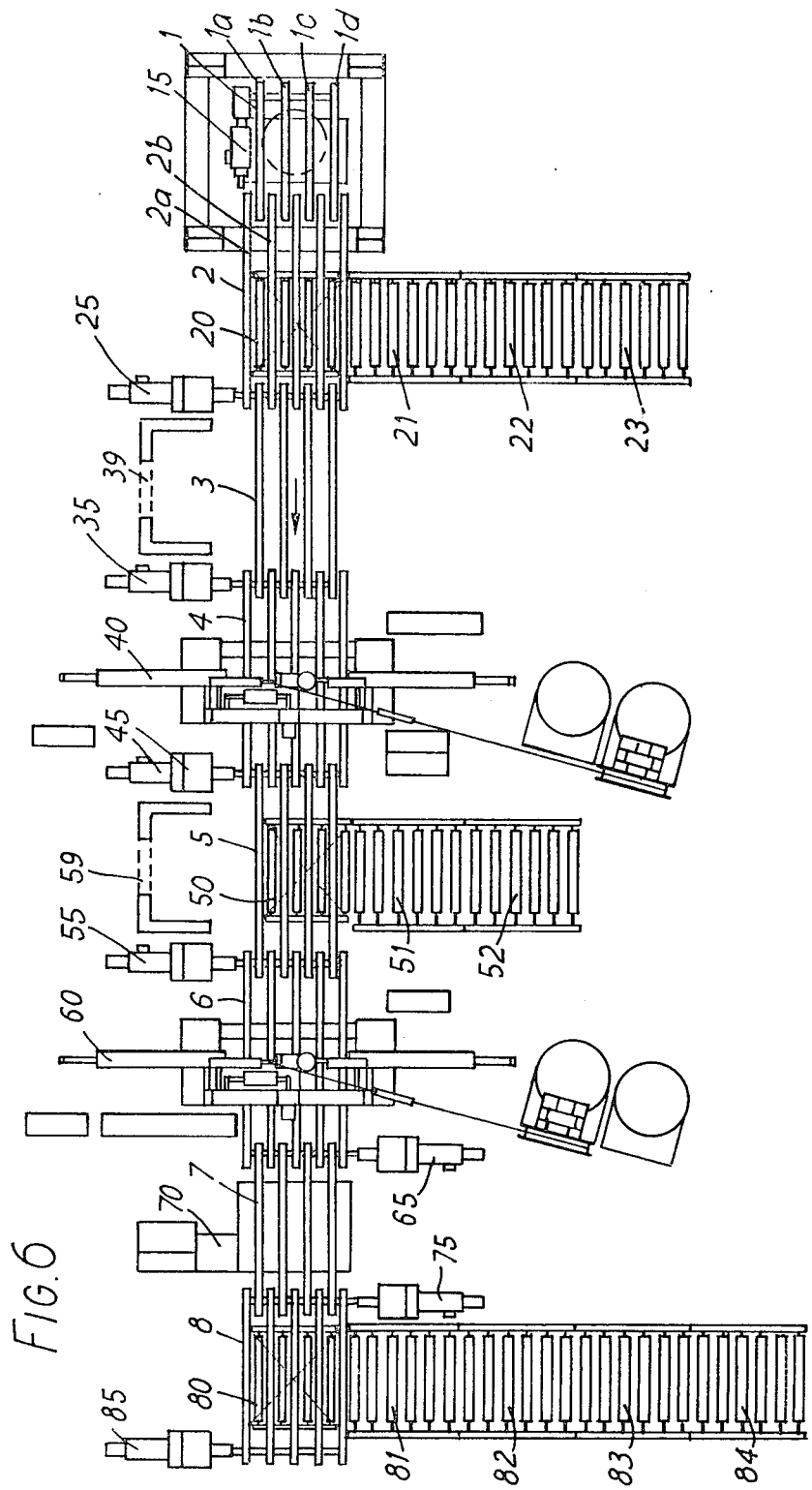
FIG. 6 is a somewhat diagrammatic plan view of a packing line embodying the invention.
Figure 7:
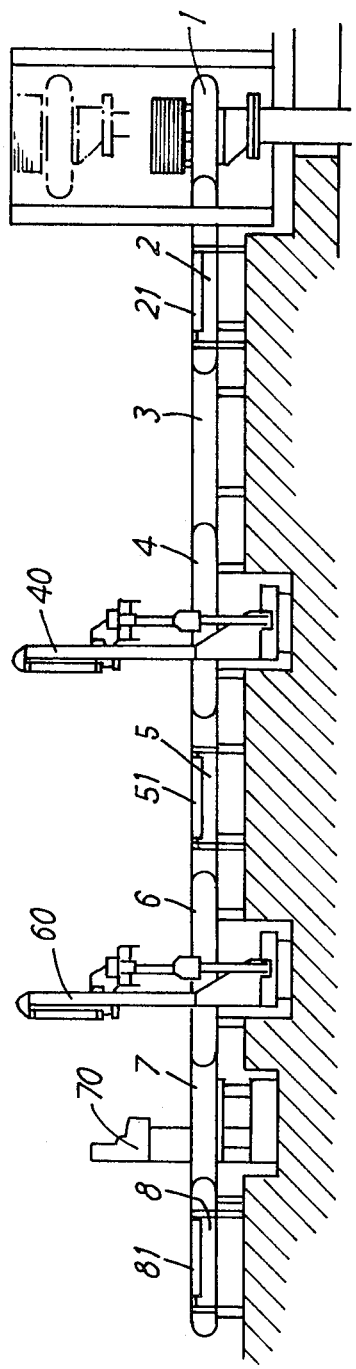
FIG. 7 is a diagrammatic side view of the packing line of FIG. 6.

The packing line of FIGS. 6 and 7 is arranged at the end of a tinning line for steel strip, after the cutting and sorting stages, though in principle the packing line can be separate from a tinning line. In both Figures, the direction of movement of stacks being packed is generally from right to left.

The packing line has a main conveyor path composed of eight chain conveyors 1 to 8 and a take-out roller conveyor 80 to 84 to which packed stacks are transferred from the last chain conveyor 8. The chain conveyors 1 to 8 consist alternately of four and five parallel endless chains (1a, 1b, 1c, 1d, 2a, 2b, etc) which each have upper runs and lower runs parallel to the direction of movement of the stacks along the conveyor path. Each chain (1a,1b etc) is in conventional fashion made up of links articulated to each other, running around a continuous fixed track and with their outer surfaces providing the support surface for the pallets carrying the stacks at the upper run. Further details of their construction need not be given.

Adjacent ends of the chain conveyors 1 to 8 overlap, the chains (1a, 1b etc) engaging sprocket wheels on common axes at the ends of their runs. A continuous conveyor surface is thus provided. Each of the chain conveyors 2 to 8 is driven directly, without gearing, at its forward end (i.e. the end last reached by a pallet) by individual D.C. motors 25,35,45,55,65,75 and 85. The sprocket wheels of the chain conveyor 3 at the axis of the motor 25 driving the previous chain 2 are idling, not being driven by the motor 25, and the same applies for the conveyors 3 to 8. In this way a smoothly moving conveyor which is not likely to subject the stacks to jerks is obtained. The chain conveyors 2 to 6 are all of equal length, so that parts are interchangeable and repair and maintenance is facilitated.

The first chain conveyor 1 is at the collector station for the tinplate sheets. It is movable vertically by means of a screw jack, as FIG. 7 shows, so that the pallets which are successively placed on it (with the sheet 109 in position—see FIG. 1) are in position each to have a stack of sheets built up on them. The conveyor 1 is also rotatable as a whole through 90° about a vertical axis, so that (as described above) a pallet placed on it with its runners 102 (see e.g. FIG. 1) transverse to the chains 1a,1b,1c,1d can receive a stack with the transverse sheared edges of the sheets either parallel to or perpendicular to the runners 102. When a stack is formed the conveyor 1 is lowered and if necessary rotated through 90° to bring the pallet to the level of the conveyor 2, to which it is then transferred by operation of the motor 15. The motor 15 drives the sprocket wheels at the rearward end of the conveyor 1 as FIG. 6 shows, because the chains at the forward end must be able to move vertically with respect to the chains of the conveyor 2. To permit continuous stacking, auxiliary means are provided on which a stack begins to form, until the conveyor returns to pick it up.

Between the chains of the conveyor 2 rollers 20 of a liftable roller conveyor can move upwardly in order to pick up a stack on the conveyor 2 and transfer it to a branch conveyor formed of roller conveyors 21,22,23. This branch can be used to take out stacks for instance in the event of a breakdown further down the main conveyor path, or to introduce stacks formed elsewhere to the main conveyor path.

The chain conveyor 3 is located at a manual packing station, at which most of the packaging components (e.g. parts 103,104,108,110,111 of the package of FIG. 1) are manually applied, with the aid of suitable mechanical devices, for instance arms to embrace and hold the package as indicated by part 39 in FIG. 6. The packer at the manual packing station ties a single steel strip around the package, this holding the packaging in place until full tying occurs as described next. This single strip extends parallel to the general travel direction of the stacks.

Above the chain conveyor 4 is a strapping machine 40, of conventional form e.g. of the make "Titan". This automatically ties four steel strips tightly around the packed stack, these strips extending transversely of the stack between the runners 102 of the pallet.

Chain conveyor 5 is at a second manual packing station (complete with packing aid 59) and conveyor 6 is beneath a second automatic strapping machine. These permit double packing of the stack, e.g. for the package of FIG. 2.

The chain conveyor 5 is optionally provided, as shown, with a liftable roller conveyor 50, similar to the conveyor 20 at chain conveyor 2, which can be used to take out stacks to a branch made of roller conveyors 51,52, e.g. in the event of breakdown. However, the presence of conveyors 50,51,52 prevents, or makes difficult, packing of a stack on the conveyor 5, and therefore they may be omitted.

The chain conveyor 7 is a weighing conveyor with a weighing device 70 for weighing the whole packed stack.

The chain conveyor 8 has a lifting roller conveyor 80, like the conveyors 20 and 50, which transfers the packed stacks to roller conveyors 81,82,83, 84, which store the stacks temporarily until they can be removed, e.g. by a fork lift truck.

The pallets are able to run on the roller conveyors 20-23, 50-52, 80-84 because their runners 102 are transverse to the axes of the rollers in these conveyors. The roller conveyors 21-23, 51-52, 81-84 are suitably 5 mm above the chain conveyors 1–8. The upper surfaces of the chain conveyors 1–8 are all at one level.

The design of this packing line thus has the many advantages discussed above. Great improvements in productivity may thus be achieved.

What is claimed is:

1. Packing line for packing stacks of rectangular tinplate sheets on pallets having bottom parallel runners, comprising
   (a) a continuous conveyor path for said palletized stacks comprised of a path of a plurality of chain conveyors arranged end-to-end but with the ends of each chain conveyor overlapping the ends of its adjacent chain conveyor and at least one roller conveyor, each said chain conveyor over at least a portion of said chain conveyor path having at least three parallel endless spaced chains each with upper and lower runs moving parallel to the travel direction of the stack, the upper run providing a support surface for the palletized stacks with the pallet runners extending transversely to said chain conveyors path,
   (b) a first one of said chain conveyors being a collector station at which successively said palletized stacks are formed on the pallets, the said first conveyor being vertically movable and rotatable about a vertical axis through at least 90° so as to be capable of turning a stack through 90°, the end of said first chain conveyor being independent of the end of the adjacent overlapping chain conveyor,
   (c) a first manual workstation in said conveyor path at which manual packing operations are performed on the stacks,
   (d) a second one of said chain conveyors being located before said manual workstation and after said first chain conveyor in the direction of travel of the stack,
   (e) a third one of said chain conveyors located at said manual workstation,
   (f) a fourth one of said chain conveyors,
   (g) a strapping machine adapted automatically to apply straps transversely of the conveyor path around a palletized stack partially packed at said manual workstation, said strapping machine being located adjacent said fourth one of said chain conveyors, in the direction of travel of the palletized stacks, and
   (h) a branch roller conveyor which is liftable to move one of its rollers between each two adjacent parallel chains and above the upper runs to enable palletized stacks to be moved into and out of the chain conveyor path, said roller conveyor positioned after said collector station and before said first manual packing station.

2. The packing line according to claim 1, including
   (i) a fifth chain conveyor,
   (j) a second manual workstation at said fifth one of said chain conveyors located after said strapping machine in the direction of travel of the stacks,
   (k) a sixth chain conveyor, and
   (l) a second strapping machine at said sixth one of said chain conveyors located after said second manual workstation in the direction of travel of the stacks.

3. The packing line according to claim 2, including
   (m) a seventh one of said chain conveyors,
   (n) a transfer station, and
   (o) a roller conveyor to which the packed stacks are transferred and which provides temporary storage for the packed stacks.

4. The packing line according to one of claims 1 or 2, wherein at least some of said chain conveyors are of identical length and parts are interchangeable between them.

5. A packing line according to one of claims 1 or 2, wherein each said chain conveyor is composed of a plurality of said endless chains arranged side-by-side spaced from each other and driven in common.

* * * * *